United States Patent [19]

Hegemann

[11] 4,007,025
[45] Feb. 8, 1977

[54] APPARATUS FOR CLEANING STACK GAS AND USING SAME FOR GENERATION OF ELECTRIC POWER

[75] Inventor: Karl-Rudolf Hegemann, Essen-Bergerhausen, Germany

[73] Assignee: Gottfried Bischoff Bau Kompl., Essen, Germany

[22] Filed: Nov. 4, 1974

[21] Appl. No.: 520,920

[30] Foreign Application Priority Data

Nov. 6, 1973 Germany .......................... 2355457
Aug. 20, 1974 Germany .......................... 2439757
Aug. 20, 1974 Germany .......................... 2439758

[52] U.S. Cl. .................................... 55/213; 55/226; 55/258; 55/344; 55/385 R; 261/23 R; 261/DIG. 56; 261/62; 266/147; 266/157; 55/385 D

[51] Int. Cl.[2] .......................................... B01D 47/10

[58] Field of Search .................. 55/21, 93, 94, 210, 55/213, 223, 226, 238, 257, 258, 315, 344, 418, 385 R, 385 D; 261/DIG. 54, DIG. 56, 23 R, 62; 266/15, 31, 147, 157; 60/39.09 D, 516, 519; 290/52

[56] References Cited

UNITED STATES PATENTS

| | | | |
|---|---|---|---|
| 2,288,734 | 7/1942 | Noack | 55/315 X |
| 2,670,912 | 3/1954 | Lindsey et al. | 60/39.09 D |
| 2,812,899 | 11/1957 | Meschino | 60/39.09 D |
| 3,041,059 | 6/1962 | Powell | 266/31 X |
| 3,274,395 | 9/1966 | Rizk | 290/52 |
| 3,274,757 | 9/1966 | Wapler | 55/238 |
| 3,726,065 | 4/1973 | Hausberg et al. | 55/223 |
| 3,791,108 | 2/1974 | Hausberg et al. | 55/226 |
| 3,799,502 | 3/1974 | Baum | 266/31 X |
| 3,820,307 | 6/1974 | Hausberg et al. | 55/226 |
| 3,844,745 | 10/1974 | Hausberg et al. | 55/257 X |
| 3,854,300 | 12/1974 | Gerhold | 62/88 |

FOREIGN PATENTS OR APPLICATIONS 1,148,528  5/1963  Germany .......................... 55/21

*Primary Examiner*—Frank W. Lutter
*Assistant Examiner*—David L. Lacey
*Attorney, Agent, or Firm*—Karl F. Ross; Herbert Dubno

[57] ABSTRACT

Stack gas is first passed through a coarse-particle separator and then a prescrubbing tower. Then this gas, which is under pressure, is passed through a pair of Venturi washers. The output side of one of the washers is connected directly to a droplet separator at the output of the system. The outlet of the other Venturi washer is connected through a turbine driving an electric generator and having its output side in turn connected to the droplet separator. The control body of at least the washer which is connected directly to the droplet separator is adjustable so as to maintain a constant back pressure in the system at the blast furnace from which the stack gas comes. The Venturi washer connected to the turbine is set up to pass at least four times as much of the gas as the other Venturi washers so that most of the gas passes through the turbine, undergoing a pressure drop that is transformed into the work of driving the turbine and generates electricity.

5 Claims, 5 Drawing Figures

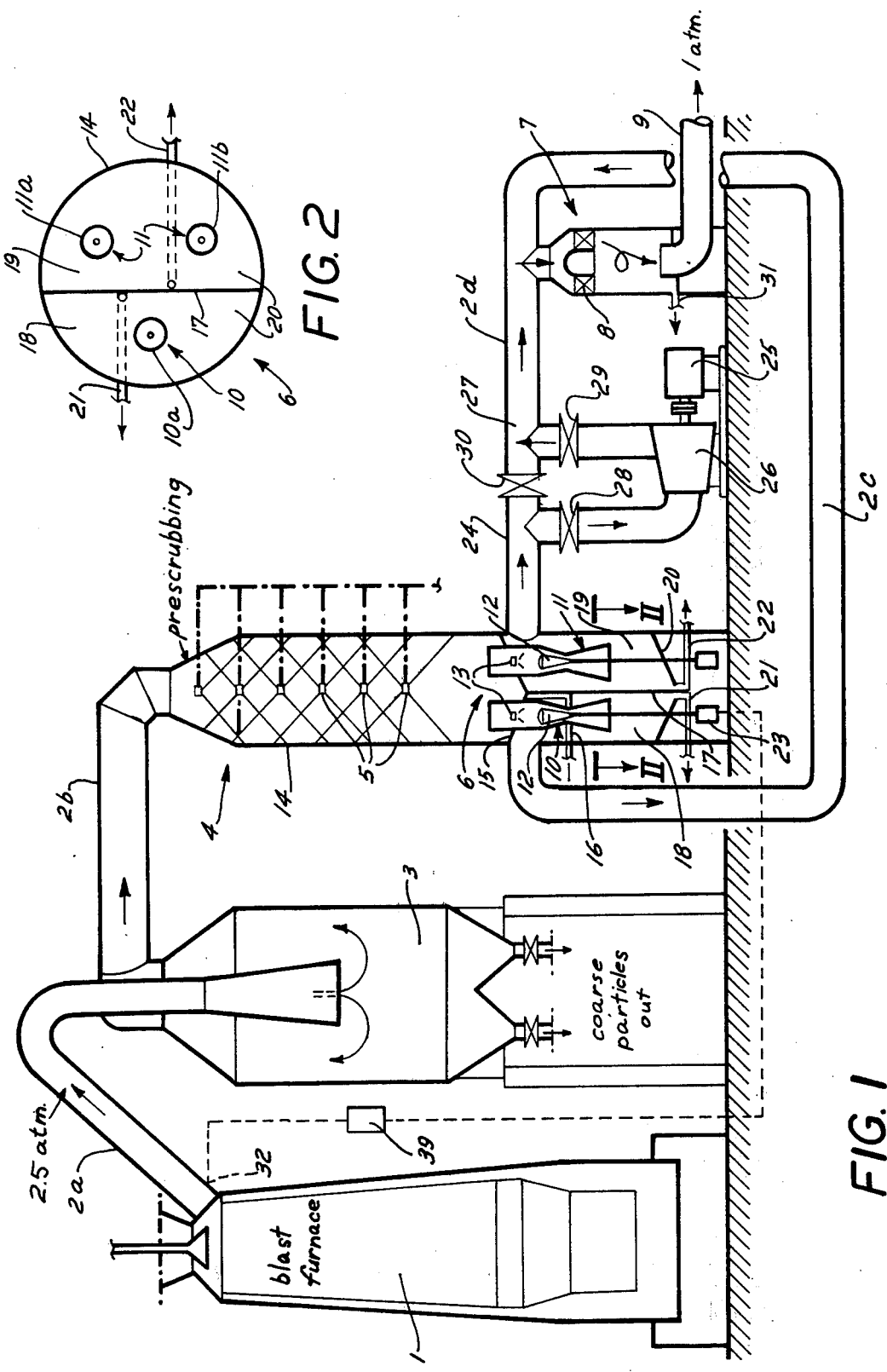

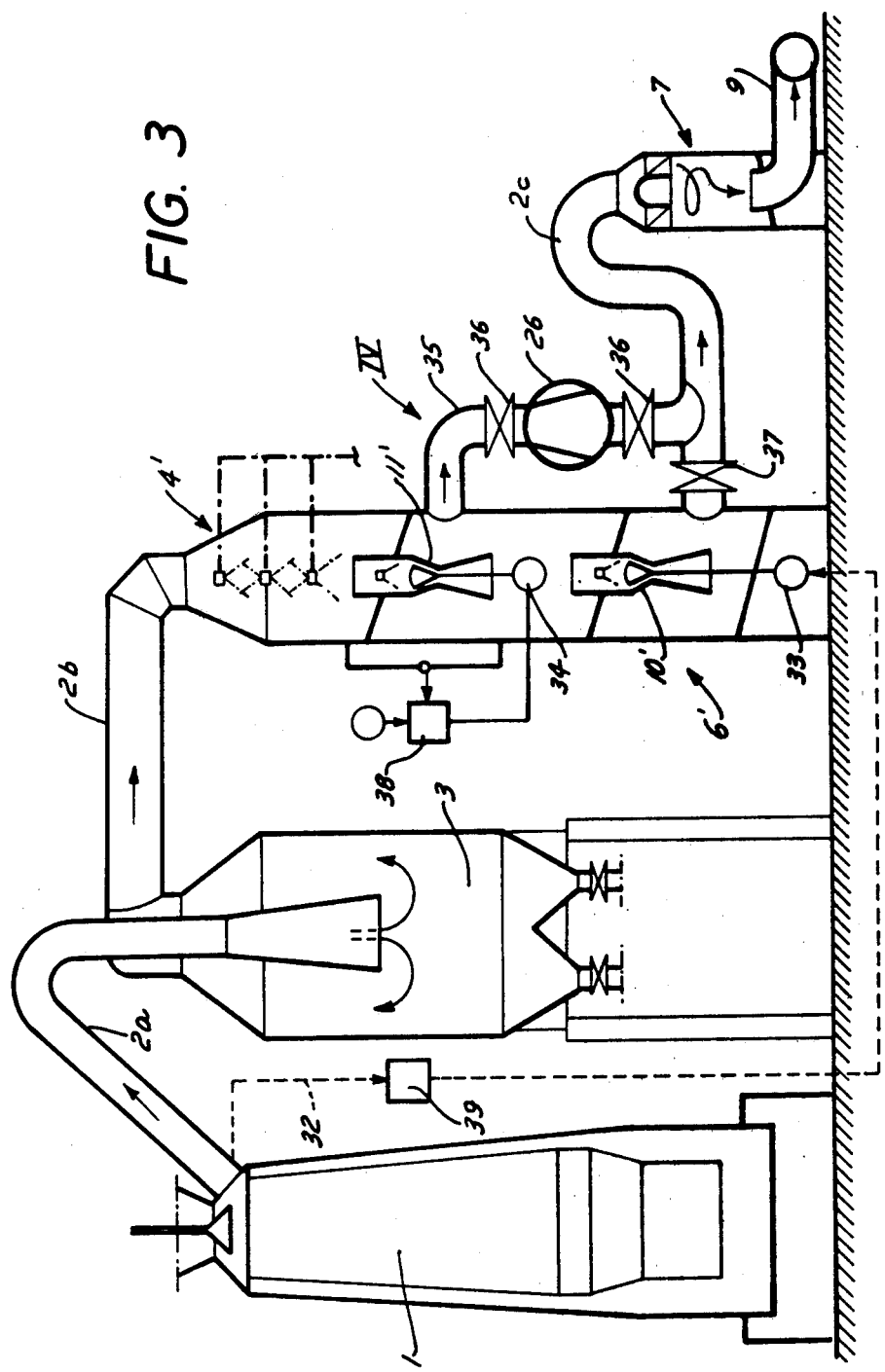

APPARATUS FOR CLEANING STACK GAS AND USING SAME FOR GENERATION OF ELECTRIC POWER

CROSS-REFERENCE TO RELATED APPLICATION

This application is related to commonly assigned and copending application Ser. No. 345,762 filed Mar. 28, 1973 (now U.S. Pat. No. 3,854,908) as a continuation-in-part of application Ser. No. 225,208 filed on Mar. 15, 1972 (now U.S. Pat. No. 3,844,744) citing application Ser. No. 188,577 filed Oct. 12, 1971 (now U.S. Pat. No. 3,726,065).

Field of the Invention

The present invention relates to an apparatus for treating pressurized stack gas. More particularly this invention concerns the treatment of such gases issuing from blast furnaces and the like.

BACKGROUND OF THE INVENTION

Hot stack gases which issue from a blast furnace or the like at a pressure of several atmospheres are usually passed through a cleaning or purifying device which first separates out the larger particles carried by the gas and then subjects the gas to a scrubbing operation which removes many of the water-soluble gas components and removes additional particles from the gas stream. The above-cited earlier applications describe so called Venturi washers which comprise a Venturi tube having a narrow waist in which is received a Venturi body that is displaceable within this tube so as to define a variable gap therewith. A sprayer is provided in the upstream end of the tube so that the turbulence and pressure drop in the Venturi will thoroughly wash the remaining particles from the gas.

Such Venturi washers are used to maintain a constant back pressure in the blast furnace. A constant back pressure is necessary for proper functioning of the furnace and can readily be maintained by the Venturis. At the same time such devices serve to drop the pressure so that the cleaned stack gases can be used in regenerators for heating up the charge or the air that goes into the furnace. As a rule a plurality of such Venturi or annular-gap washers are used with all of their Venturi bodies ganged so as to permit adjustment of the pressure drop across them to maintain the pressure in the blast furnace constant.

Such systems are relatively effective. However they have the principal disadvantage that they waste a considerable amount of energy present in the hot pressurized stack gas. A significant amount of energy available to do work is wasted as the gases pass through the Venturis and expand.

Objects of the Invention

It is therefore an object of the present invention to provide an improved apparatus for cleaning stack gas.

Another object of this invention is to provide a stack-gas cleaning system which recovers at least a portion of the energy present in the stack gas.

Yet another object is the provision of such a system which allows the pressure in the blast furnace to be maintained constant for most efficient blast-furnace operation.

Summary of the Invention

These objects are attained according to the present invention in a system for cleaning stack gas from a blast furnace or the like which uses a pair of Venturi washers connected either in parallel or in series in the conduit coming from the separator for removing particles and the prescrubber. The output side of one of these Venturis is connected directly to the discharge end of the system conduit and the output side of the other Venturi is connected through a turbine to this discharge end. The Venturi body of the first-mentioned Venturi washer, that is the one not connected to the turbine, is adjusted automatically in reponse to the pressure in the system at the blast furnace thus the annular gap between the Venturi body of this washer and its Venturi tube is adjusted so as to control the back pressure of this blast furnace.

In accordance with another feature of this invention the turbine is used to drive a load, a generator being particularly suitable. In this manner it is possible to generate electricity with energy that would otherwise be completely wasted in the system. The turbine according to this invention is a so-called expansion turbine, wherein a vapor admitted on one side expands in the turbine and drives its rotor.

The invention is based on the surprising fact that it is possible to regulate the pressure at the input end of the system to a very fine degree by controlling only a portion of the gas stream through the system. In accordance with the present invention the variable Venturi washer is set up for a much higher pressure drop than the other Venturi that is connected to the turbine. Thus in accordance with this invention the quantity of air per unit of time passing through the variable Venturi and the other Venturi forms a ratio of between 1:3 and 1:5, i.e. 3 to 5 parts by volume per unit time of gas traverses the turbine-feeding venturi per part of gas traversing the controlled venturi. This is achieved in accordance with a feature of this invention by providing a single variable Venturi washer and a pair of Venturi washers connected to the turbine. In accordance with a further feature of this invention the second Venturi washers connected to the turbine are also adjustable for adjustment of the system such that the turbine runs at maximum efficiency.

Thus in accordance with the present invention the two Venturi washers or the two sets of Venturi washers can be provided on a single horizontal partition wall provided in a scrubbing tower. The chamber below the partition wall is subdivided by a further partition into a pair of compartments, the other one being connected to the system output and the other compartment being connected to the turbine input.

According to yet another feature of this invention a shunt conduit is provided between the input and output sides of the turbine; valves are provided at the input and output sides of the turbine and in this shunt conduit so that it is possible to close the valve in the shunt conduit during normal operation of the turbine and to open this valve in the shunt conduit and close the other two valves to allow servicing and, indeed, removal of the turbine during continued operation of the system.

The two Venturi washers or sets of washers in accordance with yet another feature of this invention can be provided one behind the other. The variable Venturi washer is provided downstream of that Venturi washer whose output is connected in this case both to the input of the turbine and to the input of the second Venturi washer. According to the present invention the first Venturi washer is set up so that it can pass 100% of the stack gas whereas the second one can only pass a maximum of 20% of this gas.

In accordance with the present invention the turbine is so set up that it has a supplementary gas-cleaning effect that allows the formation of ice crystals in this turbine to be completely avoided. Thus the prescrubber and the first Venturi washer is operated such that the stack gas is almost completely saturated with water vapor. This saturated gas is fed to an expansion turbine that is a one or multistep centupetal turbine with a centrifugal separator housing and whose condensation effect is such that the heat of condensation maintains the fluid state of the condensate. This saturation of the stack gas in no way adversely effects the pressure regulation at the cupola of the blast furnace or the like. As long as the level of water vapor in the stack gas approaches the saturation level the heat of condensation will ensure that under all operating conditions no ice crystals form. Even though this saturation does decrease slightly the efficiency of the Venturi washers, this slight loss is more than compensated by the advantage of an additional separating function in the expansion turbine where the considerable condensation not only prevents ice-crystal formation but increases separation of particles from the gas. It is also possible within the scope of this invention to inject water into the expansion turbine.

The system according to the present invention not only serves to drop the pressure of and clean stack gases from a blast furnace or the like but it also is able to maintain the pressure of the gas within this furnace substantially constant. At the same time the normally wasted energy of this stack gas is employed to generate electricity.

BRIEF DESCRIPTION OF THE DRAWING

The above and other objects, features, and advantages at the present invention will become more readily apparent from the following, description reference being made to the accompanying drawing in which:

FIG. 1 is a vertical sectional view partly in diagrammatic form illustrating a system according to the present invention;

FIG. 2 is a section taken along line II—II of FIG. 1, drawn to an enlarged scale;

FIG. 3 is a view similar to FIG. 1 illustrating another system in accordance with this invention;

SPECIFIC DESCRIPTION

Figure 4:
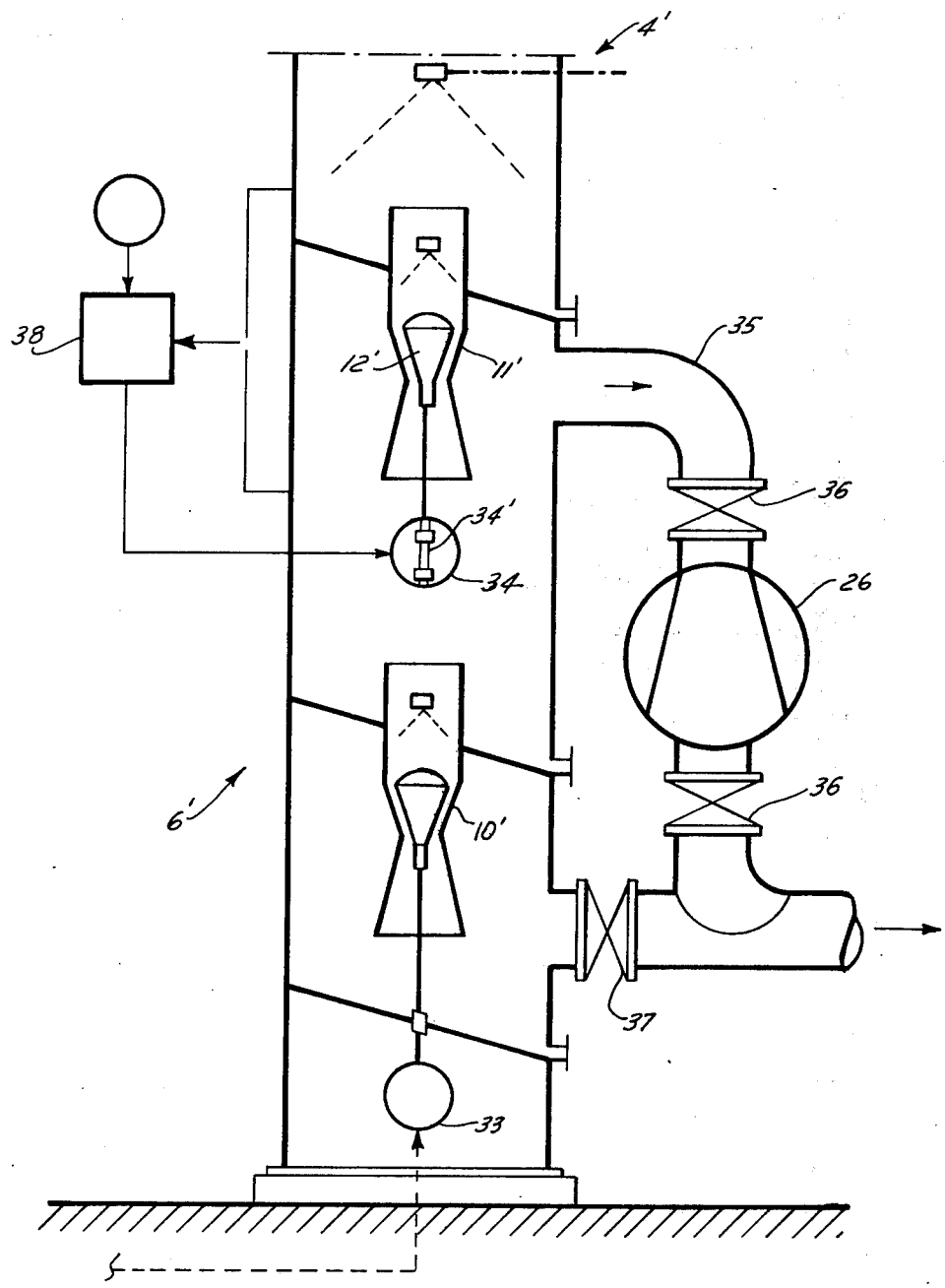
FIG. 4 is a large-scale view of the detail indicated by arrow IV of FIG. 3.

As shown in FIGS. 1 and 2 an apparatus for cleaning stack gas coming from a blast furnace 1 has a conduit whose extreme upstream section 2a leads from the cupola of the furnace to a coarse-particle separator 3. Another conduit section 2b leads from this particle separator 3 to a prescrubber 4 having a plurality of spray heads 5 that discharge water sprays which, by working serve further to remove particles from the stack gas. The thus partially purified gas then passes through a set 6 of Venturi washers from which the gas passes through conduit sections 2c and 2d to a final droplet separator 7 having angled vanes 8 the latter separator 7 removes all of the liquid from the gas before it is pulled away in a clean-gas output conduit 9. The pressure in the conduit section 2a is between 2 and 3 atmospheres and that in conduit 9 at the output of the system is approximately 1 atmosphere.

The set 6 of venturi washers comprises a plurality of Venturi-type pressure-drop washers 10 and 11 as shown in FIG. 2 having respective Venturi tubes or sleeves 10a, 11a and 11b within each of which is displaceable a Venturi body 12. Spray heads 13 are provided in the tubes 10a, 11a and 11b above the bodies 12 in a maner substantially as described in the above-cited patent applications.

The prescrubber 4 and the pressure-drop washer arrangement 6 are provided in a single upright tower 14 in which the stack gas passes from top to bottom. An upwardly concave conical horizontal partition wall 15 is provided in the tower 14 with the Venturi washers 10 and 11 passing vertically through this wall 15. Water collected by this wall 15 is drawn off through a conduit 16. Thus the wall 15 divides the tower 14 into an upper chamber and a lower chamber. An upright partition wall 17 divides the chamber below the partition wall into a pair of compartments 18 and 19, the single Venturi washer 10 opening into the compartment 18 and the two washers 11 into the compartment 19. The lower ends of these compartments are sealed by a single conical wall 20 in which are provided separate outlet conduits 21 and 22 for carrying off water.

A conduit section 2c is connected to the upper region of the chamber 18 and feeds the gas therefrom to the upper end of the droplet separator 7. A similar conduit 24 is connected to the upper end of the chamber 19 and is connected through a valve 28 to the inlet of an expansion turbine 26 whose outlet side is connected through a valve 29 to a conduit section 2d also connected to the drop separator 7. A shunt conduit section 27 is connected across the two valves 28 and 29 to the opposite sides of the turbine 26 and is provided with a shut-off valve 30 that is normally closed. Water is drawn out of the droplet separator 7 at an outlet nipple 31. The valves 28 and 29 can be closed and the valve 30 opened to allow servicing and/or removal of the turbine 26 without impairing gas flow through the system according to this invention.

The Venturi body 12 of the Venturi washer 10 is vertically displaceable by a servomotor 23 operated by a controller 39 connected to a sensor 32 at the extreme upstream end of the conduit 2a–2d. When the pressure at the sensor 32 drops below a predetermined level the body 12 of the washer 10 is moved downwardly to decrease the annular gap between it and the sleeve 10a and thereby increase the back pressure across this washer 10. Inversely when the pressure increases above a predetermined level as dictated by the sensor 32 the body 12 is lifted so as to decrease the back pressure across this washer 10 and thereby maintain a generally constant pressure in the blast furnace 1.

The pressure-drop washers 10 and 11 are so dimensioned that once the furnace 1 is operating at normal speed approximately four times more stack gas passes through the washers 11 than through the washer 10. An installation as shown in FIG. 1 is used with stack gas at an original pressure of 15,000 mm water column with 20% of this stack gas passing through the washer 10 so as to reduce the pressure by 14,000 mm water column to a pressure of 1,000 mm water column. The remaining 80% of the stack gas is fed through the second washers 11 which reduce the pressure only by 3000 mm water column so that the gas is fed to the turbine 26 with a pressure of 12,000 mm water column. This turbine 26 drops the pressure by another 11,000 mm water column so that at the drop separator 7 the gas has a pressure of 1000 mm water column. Considerable work is created by the turbine in this manner.

As the blast furnace 1 is started up the expansion turbine 26 is cut out by closing the valves 28 and 29 and opening the valve 30. Simultaneously the washers 10 and 11 are so adjusted that the various separators and scrubbing devices work at maximum efficiency. This can be effected by another control circuit similar to the control circuit 32. Once the blast furnace 1 is at regular operating condition the control apparatus 32 proceeds to function and the washers 11 are set for maximum cleaning efficiency and maximum operating efficiency of the expansion turbine and the generator 25. The valves 28 and 29 are then opened and the valve 30 closed. The control body 12 of the washer 10 is then adjusted so as to maintain the necessary backpressure at the sensor 32.

In the arrangement shown in FIG. 3 and 4 the numerals of FIGS. 1 and 2 are used wherever the structure is identical. In this arrangement the tower 4' is provided with a pair of series-connected washers 11' and 10' constituting a stepped pressuredrop washer assembly 6'.

The downstream Venturi washer 10' is provided with a servomotor 33 connected to the control 39 so as to allow adjustment of the annular gap in this washer 10', thereby changing the back pressure created thereby. A bypass conduit 35 in which an expansion turbine 26 is provided has a pair of cutoff valves 36 which allow the turbine 26 to be cut completely out of the circuit. This bypass conduit 35 opens at its upstream end into the chamber at the downstream side of the washer 11'. A valve 37 is provided in the conduit 2c into which the bypass conduit opens downstream of the turbine 26 and which is provided with the valve 37 at the upstream end of the conduit section 2c which is connected to the outlet of the washer 10'.

The control body of the washer 11' is provided with a servomotor 34 connected to a control system 38 which pneumatically displaces this control body 12' vertically by means of a cylinder illustrated schematically at 34' in FIG. 4. The upper pressure-drop washer 11 is capable of passing 100% of the stack gas whereas the downstream washer 10' can only pass at a maximum 20% of the stack gas flowing through the conduit 2a-2c.

Figure 5:
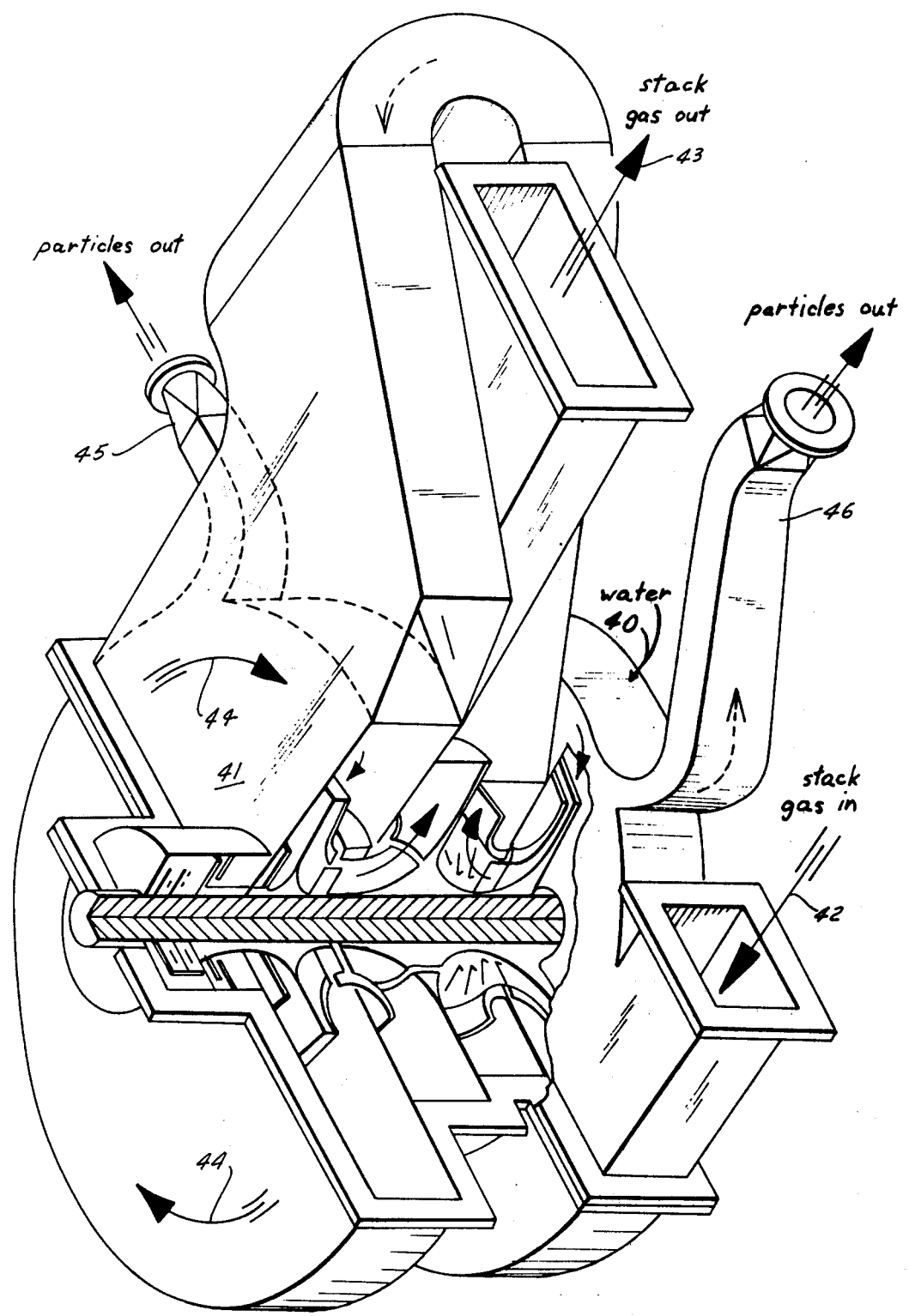
FIG. 5 is a perspective view partly in section illustrating a turbine-separator according to the present invention.

FIG. 5 shows the two-stage expansion turbine 26 according to the present invention. This turbine has a centripetal separator housing 41. A gas enters as shown by arrows 42 and leaves as shown by arrows 43. Arrows 44 indicate how the centripetal separator housing 41 is shaped substantially as a spiral. Condensate with the dust carried therewith leaves the housing 41 at the outlets 45 and 46. With such a turbine 26 the prescrubber and the pressure-drop arrangement 11 is set such that the gas is virtually saturated with water vapor so that the turbine 26 operates with a condensation effect that is so adjusted that the heat of condensation maintains the condensate fluid. In addition the expansion turbine 26 can be provided as indicated by arrow 40 with an arrangement for introducing water to its interior. Thus the expansion in this turbine 26 functions without formation of ice crystals.

I claim:
1. An apparatus for cleaning stack gas from a blast furnace, said apparatus comprising:
    a first conduit having an input end connected to said blast furnace for collecting therefrom stack gas under pressure;
    particle separating means having an inlet connected to said first conduit for removing particles from said gas, said particle separating means having an outlet for the gas from which particles have been removed;
    a second conduit connected to said outlet;
    means connected to said second conduit downstream of said means for removing particles for scrubbing said gas, said scrubbing means having an outlet;
    a variable Venturi washer having an inlet communicating with said outlet of said scrubbing means and an outlet opening downstream of said inlet of said washer for reducing the pressure of and for scrubbing said gas;
    at least one other Venturi washer having an inlet communicating with said outlet of said scrubbing means and an outlet for reducing the pressure of and for scrubbing said gas;
    an expansion turbine having an input side connected to the outlet of said at least one other Venturi washer and an output side for discharging expanded gas;
    a generator operatively connected to said turbine; and
    means including means for detecting gas pressure at said input end of said first conduit for varying the flow cross-section of said variable Venturi washer to maintain said pressure at said end constant.
2. The apparatus defined in claim 1 wherein each of said washers has a respective Venturi body and a respective Venturi tube spacedly surrounding the respective body, said means for varying the flow cross-section of said variable Venturi washer including means for displacing said body of said variable washer to vary the spacing between the latter body and the respective tube.
3. The apparatus defined in claim 2 wherein said at least one other Venturi washer has its inlet connected to the outlet of said variable washer.
4. The apparatus defined in claim 3 wherein said at least one other Venturi washer is of greater capacity than said variable washer and can pass substantially all of said stack gas, said variable washer being only capable of passing a minor portion of said gas.
5. The apparatus defined in claim 2 wherein said washers have said inlets connected in parallel to the outlet of said scrubbing means.

* * * * *